US012743761B2

(12) United States Patent
Androvandi et al.

(10) Patent No.: US 12,743,761 B2
(45) Date of Patent: Sep. 22, 2026

(54) COLLABORATIVE GENERATION OF CUTTINGS LOGS VIA ARTIFICIAL INTELLIGENCE

(71) Applicant: Schlumberger Technology Corporation, Sugar Land, TX (US)

(72) Inventors: Sophie Androvandi, Paris (FR); Karim Bondabou, Montpellier (FR); Francois Wantz, Clamart (FR); Matthias Francois, Clamart (FR); Maryellen Loan, Quincy, MA (US); Tetsushi Yamada, Cambridge, MA (US); Simone Di Santo, Dhahran (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 126 days.

(21) Appl. No.: 18/722,166

(22) PCT Filed: May 24, 2023

(86) PCT No.: PCT/US2023/023295
§ 371 (c)(1),
(2) Date: Jun. 20, 2024

(87) PCT Pub. No.: WO2023/230101
PCT Pub. Date: Nov. 30, 2023

(65) Prior Publication Data

US 2025/0139751 A1 May 1, 2025

Related U.S. Application Data

(60) Provisional application No. 63/365,459, filed on May 27, 2022.

(51) Int. Cl.

| | |
|---|---|
| ***G06T 7/00*** | (2017.01) |
| ***G06T 7/12*** | (2017.01) |

(Continued)

(52) U.S. Cl.
CPC .............. *G06T 7/0002* (2013.01); *G06T 7/12* (2017.01); *G06T 7/50* (2017.01); *G06V 10/26* (2022.01);
(Continued)

(58) Field of Classification Search
CPC .... E21B 49/005; E21B 21/065; E21B 21/066; E21B 2200/22
See application file for complete search history.

(56) References Cited

U.S. PATENT DOCUMENTS 11,512,576 B2 * 11/2022 Katterbauer ............ E21B 43/12
2014/0020954 A1 1/2014 Pelletier
(Continued)

FOREIGN PATENT DOCUMENTS

EP 3805520 A1 4/2021
WO 2022032057 A1 2/2022

OTHER PUBLICATIONS

International Search Report and Written Opinion issued in International Patent application PCT/US2023/023294 on Septemebr 8, 2023, 12 pages.

*Primary Examiner* — Kipp C Wallace
(74) *Attorney, Agent, or Firm* — Jeffrey D. Frantz

(57) ABSTRACT

A method for generating a depth log of cuttings obtained during a subterranean drilling operation includes acquiring images of the cuttings and labeling the images with a lagged depth at a rig site; generating a clustering of lithology types in the acquired images at a rig site; transferring the images and the clustering of lithology types from the rig site to an offsite location; evaluating the images and the clustering of lithology types to label each of the lithology types at the offsite location; and generating a description and/or depth log of the labeled lithology types at the offsite location.

19 Claims, 7 Drawing Sheets

(51) Int. Cl.

| | |
|---|---|
| ***G06T 7/50*** | (2017.01) |
| ***G06V 10/26*** | (2022.01) |
| ***G06V 10/762*** | (2022.01) |
| ***G06V 20/70*** | (2022.01) |
| *H04N 7/18* | (2006.01) |

(52) U.S. Cl.

CPC ............ *G06V 10/762* (2022.01); *G06V 20/70* (2022.01); *G06T 2207/20081* (2013.01); *G06T 2207/20084* (2013.01); *G06T 2207/30181* (2013.01); *H04N 7/183* (2013.01)

(56) References Cited

U.S. PATENT DOCUMENTS

| | | | | |
|---|---|---|---|---|
| 2014/0333754 | A1 | 11/2014 | Graves | |
| 2016/0370274 | A1* | 12/2016 | Rowe | G01N 15/1433 |
| 2019/0338637 | A1* | 11/2019 | Francois | E21B 49/08 |
| 2020/0284145 | A1* | 9/2020 | ElGamal | B07B 13/18 |
| 2021/0108511 | A1 | 4/2021 | Androvandi | |
| 2021/0248428 | A1 | 8/2021 | Sharma | |
| 2021/0319257 | A1 | 10/2021 | Francois | |
| 2021/0404272 | A1* | 12/2021 | Blue, III | E21B 21/066 |
| 2023/0220770 | A1 | 7/2023 | Yamada | |
| 2024/0263553 | A1* | 8/2024 | Holt | E21B 44/06 |

* cited by examiner

COLLABORATIVE GENERATION OF CUTTINGS LOGS VIA ARTIFICIAL INTELLIGENCE

CROSS REFERENCE TO RELATED APPLICATIONS

This application is a National Stage entry of International Patent Application No. PCT/US2023/023295, filed on May 24, 2023, which claims priority to U.S. Provisional Application No. 63/365,459, filed on May 27, 2022, the entirety of which is incorporated herein by reference, in its entirety.

BACKGROUND

In subterranean drilling operations, such as for oil and gas exploration and production, formation cuttings are generated by the drilling activity. These cuttings have long been evaluated and characterized to better understand the properties and structure of subsurface rock. In recent years, there has been a desire to perform such evaluation and characterization automatically (or semi-automatically) to reduce human cost and shorten the turnaround time of the interpretation. However, implementing such automation is far from routine.

Electronic image data is commonly evaluated manually during conventional drilling operations. Automatic evaluation and characterization of such data is particularly challenging since the cuttings include a wide variety of sizes, shapes, textures, and colors. Moreover, the cuttings are commonly jumbled together on a backing layer with individual particles touching and partially overlapping one another. Image lighting also tends to vary from image to image and rig to rig with shadowing and other image artifacts making the evaluation and characterization more challenging. These challenges can render image interpretation a difficult task even for trained human operators.

Furthermore, there is a desire in the industry to process cuttings images at a rapid rate with little to no human interaction. Despite at least two decades of ongoing research there remains a need in the industry for improved methods (particularly automated or semi-automated methods) for evaluating and characterizing drilling cuttings.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 8A and 8B (collectively FIG. 8) depict an example software application showing a clustered image and corresponding measurement data for the clusters in which FIG. 8A depicts the application as configured for rig site personnel, and FIG. 8B depicts the application as configured for offsite personnel.

DETAILED DESCRIPTION

In one example embodiment, a method for generating a depth log of cuttings obtained during a subterranean drilling operation includes acquiring images of the cuttings and labeling the images with a lagged depth at a rig site; generating a clustering of lithology types in the acquired images at a rig the site; transferring the images and the clustering of lithology types from the rig site to an offsite location; evaluating the images and the clustering of lithology types to label each of the lithology types at the offsite location; and generating a description and/or depth log of the labeled lithology types at the offsite location.

As known to those of ordinary skill, drilling a subterranean borehole (e.g., in oil and gas exploration and/or production operations) generates a large volume of rock cuttings that are available at the rig site. In current drilling operations, these cuttings are commonly evaluated by geologists, petrophysicists, and/or other experts at the rig site, for example, to evaluate local lithology and the oil bearing potential of the well. The cuttings description and evaluation are generally manual and repetitive tasks performed at the rig site. A commonly implemented workflow requires rig personnel to identify each lithology type by performing chemical and/or physical measurements on cuttings samples. Upon identifying the lithology types in the cuttings sample, the operator describes the rock characteristics (color, hardness, grain size, etc.), for example, on paper.

In more recent times, there has been a strong desire to implement automated evaluation of the cuttings (e.g., via using artificial intelligence and neural networks to evaluate digital images of the cuttings). One motivating factor in implementing automated methods is to remove costly experts from the rig site. While such automated processing and evaluation is promising, there are also a number of difficulties as described above in the background section of the disclosure. Moreover, automation of the full workflow is challenging due to the physical constraints of performing the cuttings description (e.g., the need to make chemical and physical measurements of the cuttings and to evaluate those measurements along with images or real-life samples of the cuttings). The disclosed embodiments are intended to address the above described needs without implementing a fully automated cuttings evaluation methodology. As described in more detail below, the disclosed methods may advantageously enable expert personnel (e.g., geologists, petrophysicists, and the like) to evaluate cuttings and the corresponding lithology from multiple drilling operations essentially simultaneously at an offsite (off-rig site) location.

Figure 1:
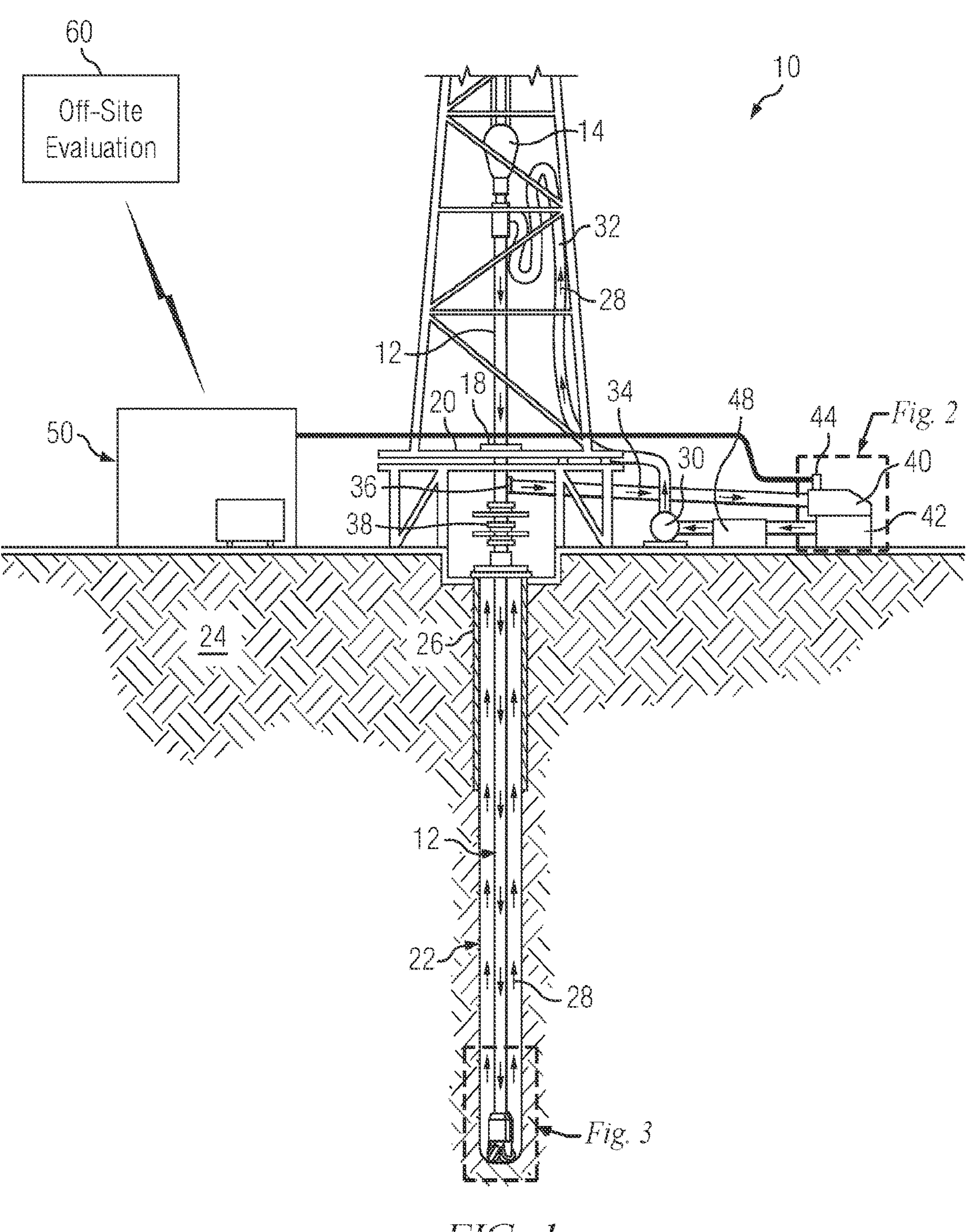
FIG. 1 depicts an example drilling rig including a surface analysis and control system.

FIG. 1 depicts an example drilling rig including a surface analysis and control system 50 in communication with a remote (e.g., offsite) evaluation center 60. In the depicted embodiment, a drill string 12 may be suspended at an upper end by a kelly and a traveling block 14 and terminate at a lower end at a drill bit 16. The drill string 12 and the drill bit 16 may be rotated, for example, by a rotary table 18 on a driller floor 20, thereby drilling a borehole (wellbore) 22 into an earth formation 24, where a portion of the borehole 22 may be cased by a casing 26. As illustrated, in certain embodiments, drilling fluid or drilling "mud" 28 may be pumped by a mud pump 30 into the upper end of the hollow drill string 12 through a connecting mud line 32. From there, the drilling fluid 28 may flow downward through the drill string 12, exiting the drill string 12 through openings in the drill bit 16, and may return to the surface by way of an annulus formed between the wall of the borehole 22 and an outer diameter of the drill string 12. Once at the surface, the drilling fluid 28 may return through a return flow line 34, for example, via a bell nipple 36. As illustrated, in certain embodiments, a blowout preventer 38 may be used to prevent blowouts from occurring in the drilling operation 10.

Figure 2:
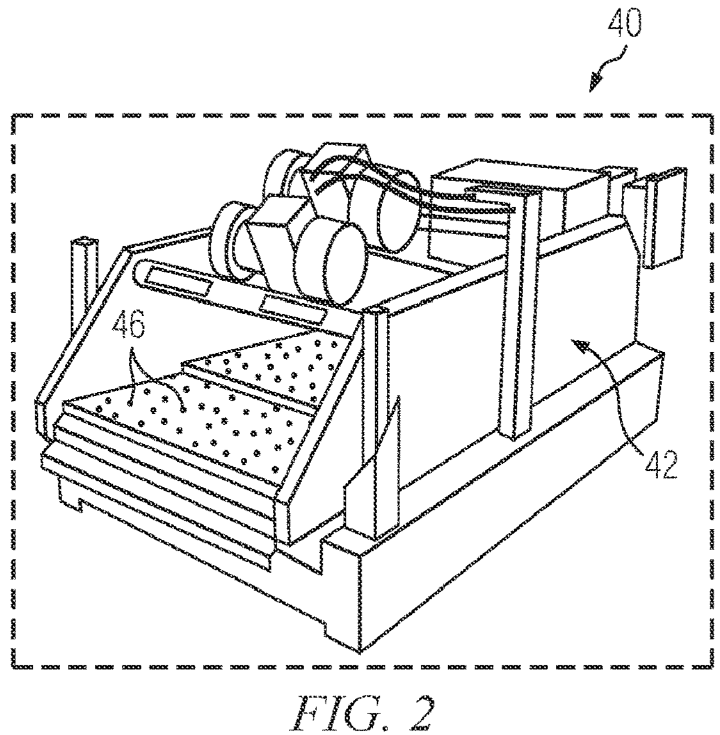
FIG. 2 depicts an example apparatus configured to remove drill bit cuttings from the drilling fluid in use in the rig depicted in FIG. 1.
Figure 3:
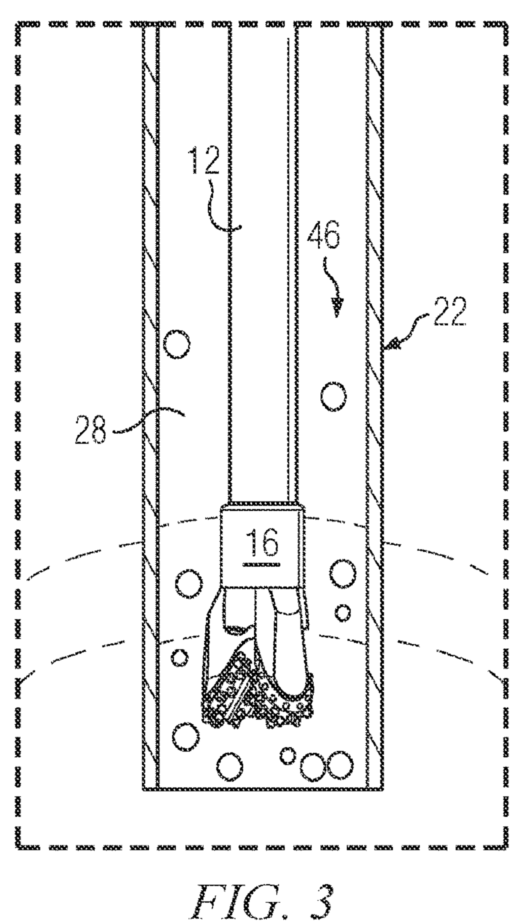
FIG. 3 depicts an example drill bit generating drill bit cuttings in use in the rig depicted in FIG. 1.

As further depicted on FIG. 1, drill bit cuttings that are formed by the drill bit 16 crushing rocks in the formation 24 may be removed from the returned drilling fluid 28 by a shale shaker 40 in the return flow line 34. The drilling fluid 28 may be reused and recirculated downhole. The shale shaker 40 may include a shaker pit 42 and a gas trap 44. FIG. 2 depicts drill bit cuttings 46 that have been removed from the drilling fluid 28 in the shaker pit 42 of the shale shaker 40 before the drilling fluid 28 is delivered to a mud pit 48. Moreover, FIG. 3 depicts cuttings flowing up through the borehole annulus after being generated by drill bit 16 during drilling.

As noted above, and depicted in FIG. 1, the rig may include an analysis and control system 50 (e.g., a mud logging unit) that may be used to control the drilling operation 10, as well as provide analysis of the drill bit cuttings 46, as described in greater detail herein. In certain embodiments, the analysis and control system 50 may be configured to automatically (or semi-automatically) analyze photos of the drill bit cuttings 46 that are generated during drilling. As depicted, the analysis and control system 50 is in electronic communication with an offsite evaluation center 60. The evaluation center may be configured to further automatically, semi-automatically, or manually evaluate the images (photos) of the cuttings as well as other data generated at the rig site. One or more mud logging experts may be employed at the offsite evaluation center 60 and may provide mud logging expertise to multiple drilling rigs without having to be physically present at those rigs. It will be appreciated that the offsite evaluation center 60 is not necessarily located completely offsite. For example, the offsite evaluation center may be located elsewhere on the rig but at a different location than the control system 50 or at another drilling rig or pad within a local oilfield that includes multiple rigs.

With continued reference to FIG. 1, the analysis and control system 50 and the offsite evaluation center 60 may include computer hardware and software configured to automatically or semi-automatically evaluate cuttings images. To perform these functions, the hardware may include one or more processors (e.g., microprocessors) which may be connected to one or more data storage devices (e.g., hard drives or solid state memory). As is known to those of ordinary skill, the processors may be further connected to a network interface to enable communication with various surface and/or downhole sensors, gauges, and so forth as well as to communicate with actuators and other surface and/or downhole equipment. Moreover, a network interface may provide for electronic communication between the analysis and control system and the offsite evaluation center 60. It will, of course, be understood that the disclosed embodiments are not limited to the use of or the configuration of any particular computer hardware and/or software.

Figures 4, 5:
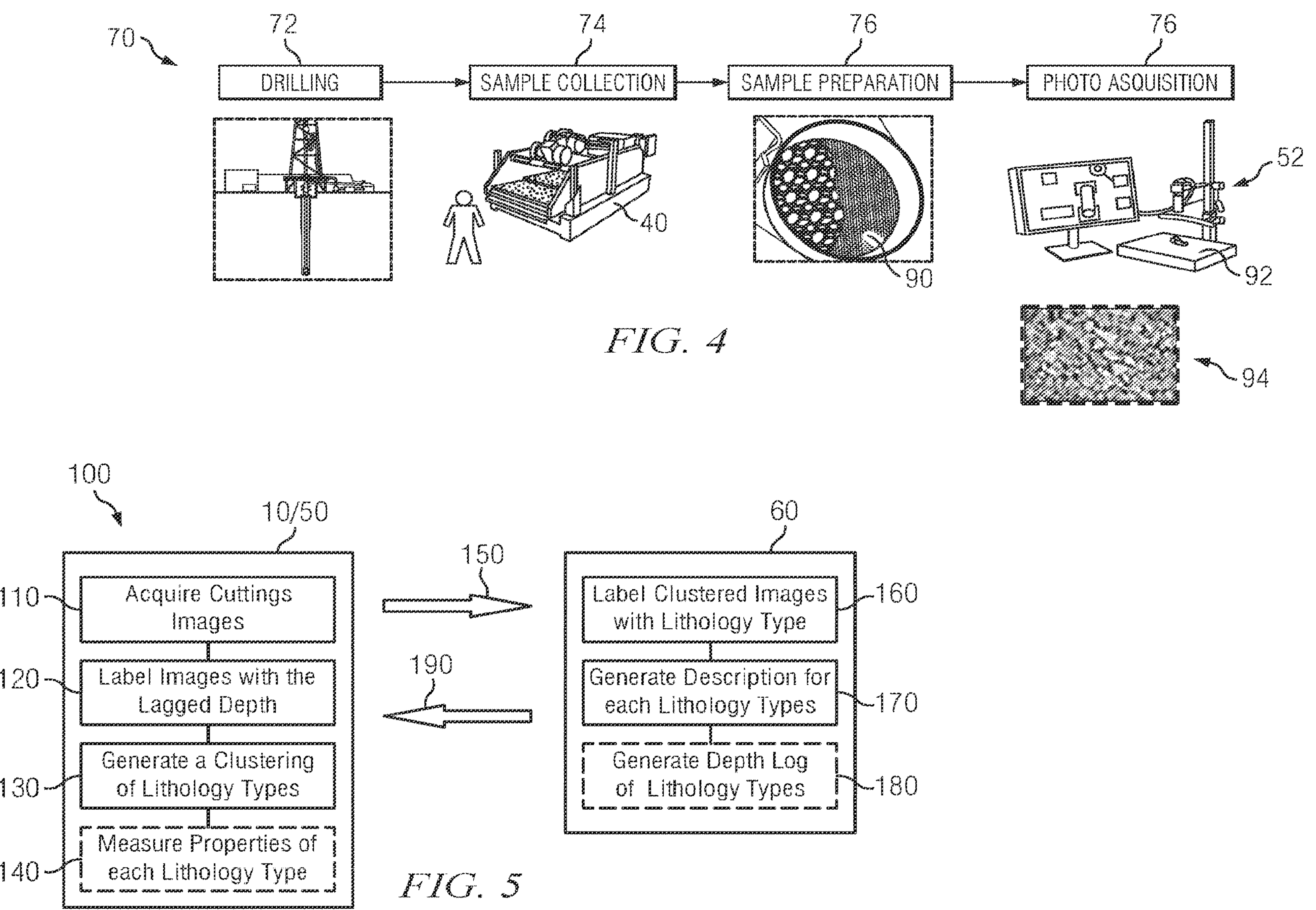
FIG. 4 depicts an example process for obtaining cuttings images.
FIG. 5 depicts a flow chart of an example collaborative method for generating a full description of cuttings obtained during a drilling operation.

Turning now to FIG. 4, an example process 70 for obtaining cuttings images is depicted. A borehole is drilled at 72, for example, using the rig equipment described above with respect to FIG. 1. The drilling operation generates cuttings as also described above. The cuttings are collected at 74, for example, from a shale shaker 40, as described with respect to FIG. 2. In example embodiments, the cuttings may be prepared for analysis at 76, for example, by washing and then drying in an oven and/or sieving or meshing the cuttings (e.g., as shown at 90) to remove large and/or small particles. The cuttings may further be placed in a tray 92 having a high contrast (vivid) background color to enhance particle identification and segmentation in the acquired images. The tray 92 may be placed in front of a digital camera 52 (e.g., located onsite at the analysis and control system 50) and a photo 94 may be taken at 78. In certain embodiments, the image acquisition process may make use of standardized and/or calibrated lighting, color enhancement, magnification, and/or focus/resolution settings. For example, in certain embodiments, color/illumination calibration is obtained by using colorimetry algorithms against previously analyzed photos 94 and a current photo of interest 94, while resolution calibration may be based on lens focal length, focal distance, and sensor size/resolution for the current photo 94 of interest as compared to that of previously analyzed photos 94. Images may be taken when the cuttings are wet or dry, with the humidity generally being controlled for dry cuttings images.

FIG. 5 depicts a flow chart of an example collaborative method 100 for generating a full description of cuttings obtained during a drilling operation. The method includes acquiring images of drill cuttings at 110, for example, as described in the example process 70 depicted on FIG. 4. The images may be labeled at the rig site at 120 with a lagged depth indicating a measured depth in the wellbore at which the cuttings were generated during drilling. A clustering of lithology types in the labeled images is generated at the rig site at 130. Physical properties of each lithology type may optionally be measured at the rig site at 140. The depth-labeled images, the clustering of lithology types, and the optional physical property measurements of each of the lithology types are transferred (e.g., digitally transmitted) from the rig site to the offsite evaluation center (an offsite location) at 150. The transferred data (the depth-labeled images, the clustering of lithology types, and the physical property measurements) may be evaluated at the offsite evaluation center at 160 to add a lithology type label (a name or designator such as sandstone, shale, carbonate, and the like) to each cluster in the clustered image. The transferred data is further evaluated to generate a cuttings description for each of the lithology types (clusters) at 170. In certain example embodiments, the cuttings description and lithology type label may be optionally further processed at the offsite location at 180 to generate a depth log of the labeled lithology types and cuttings properties. As further depicted on FIG. 5, the cuttings description and/or the depth log may be transmitted back to the rig at 190. Moreover, requests may be transmitted at 190 from the offsite evaluation location 60 to the rig control system 10/50 for additional information or requesting additional measurements to assist in generating the cuttings description and labels and/or the depth log.

The disclosed embodiments (e.g., the workflow depicted on FIG. 5) are intended to enable a cuttings description and depth log to be generated at an offsite location, which is not currently possible owing to the geological expertise required. The disclosed workflow is intended to enable removal of geological expertise from the rig site and to enable the geological expert to evaluate well cuttings from multiple wells at an offsite location while the wells are being drilled. The disclosed clustering methodology enables better interaction between the onsite and offsite personnel and equipment without the need for fully automated lithology recognition. In certain embodiments, physical tests may still be performed by well site (rig site) operators and may further enable offsite experts to guide and direct such measurements and tests. Recognition of the lithology may be performed by the offsite expert in this way. Such collaboration may provide for the first time a way to remove geological expertise from the rig site and may further enable the experts to monitor, evaluate, and classify multiple drilling operations simultaneously (even on exploration wells). In this way, the productivity of such experts may be enhanced and corresponding cost savings realized.

With continued reference to FIG. 5, the acquired image (obtained at 110) may be calibrated, for example, as described above with respect to FIG. 4. It will further be appreciated that the cuttings sample from which the image is generated is understood to be a representation of the one or more lithology types through which the borehole is penetrating.

The images may be labeled at 120 with the lagged depth based on a known or computed lagged depth of the cuttings sample. It will be appreciated that the lagged depth may be determined from the time at which the drill cuttings sample emerges from the well or at which the cuttings are collected from the shale shaker and the time delay (the lag time) required to transport the cuttings up the borehole annulus to generate a time at which the cuttings were generated in the well (e.g., by subtracting the lag time from the time at which the cuttings arrive at the surface). This time may then be correlated with a measured depth log to determine the lagged depth.

The image(s) may be evaluated at 130 to generate a cluster of lithology types (also referred to as a clustering of the mixture). The clustering may be generated automatically and may be supervised or unsupervised. For example, by supervised, it may mean that the operator may provide the number of rock types (or lithology types) in the sample. Alternatively, for example in a fully automated clustering, the clustering algorithm may determine the number of lithology types in the sample.

Figures 6A, 6B:
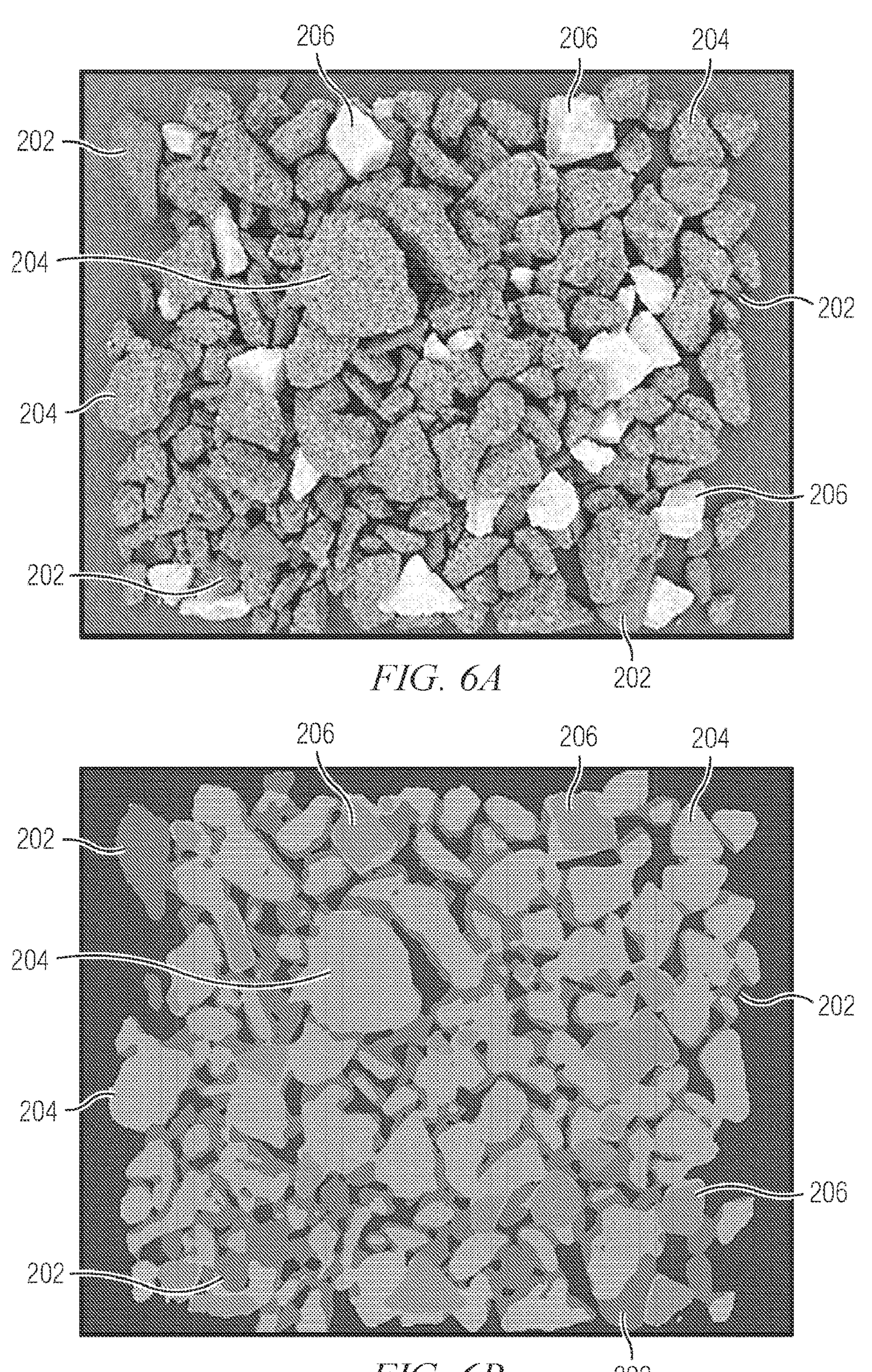
FIGS. 6A and 6B (collectively FIG. 6) depict an example photographic image (6A) including three distinct lithology types and a corresponding clustering shown as a grey-scaled (pseudo color original) image (6B).

FIGS. 6A and 6B (collectively FIG. 6) depict an example greyscale image (6A) including three distinct lithology types (red, tan and white as depicted in color) and a corresponding pseudo-colored image (shown in greyscale) (6B) highlighting the corresponding lithology types. The three distinct lithology types are indicated by 202, 204, and 206 in each of the images. Note that the lithology types are not labeled with a particular lithology label or type at this time, but are used by the wellsite operator to perform physical and/or chemical tests on each identified lithology type.

Figure 7:
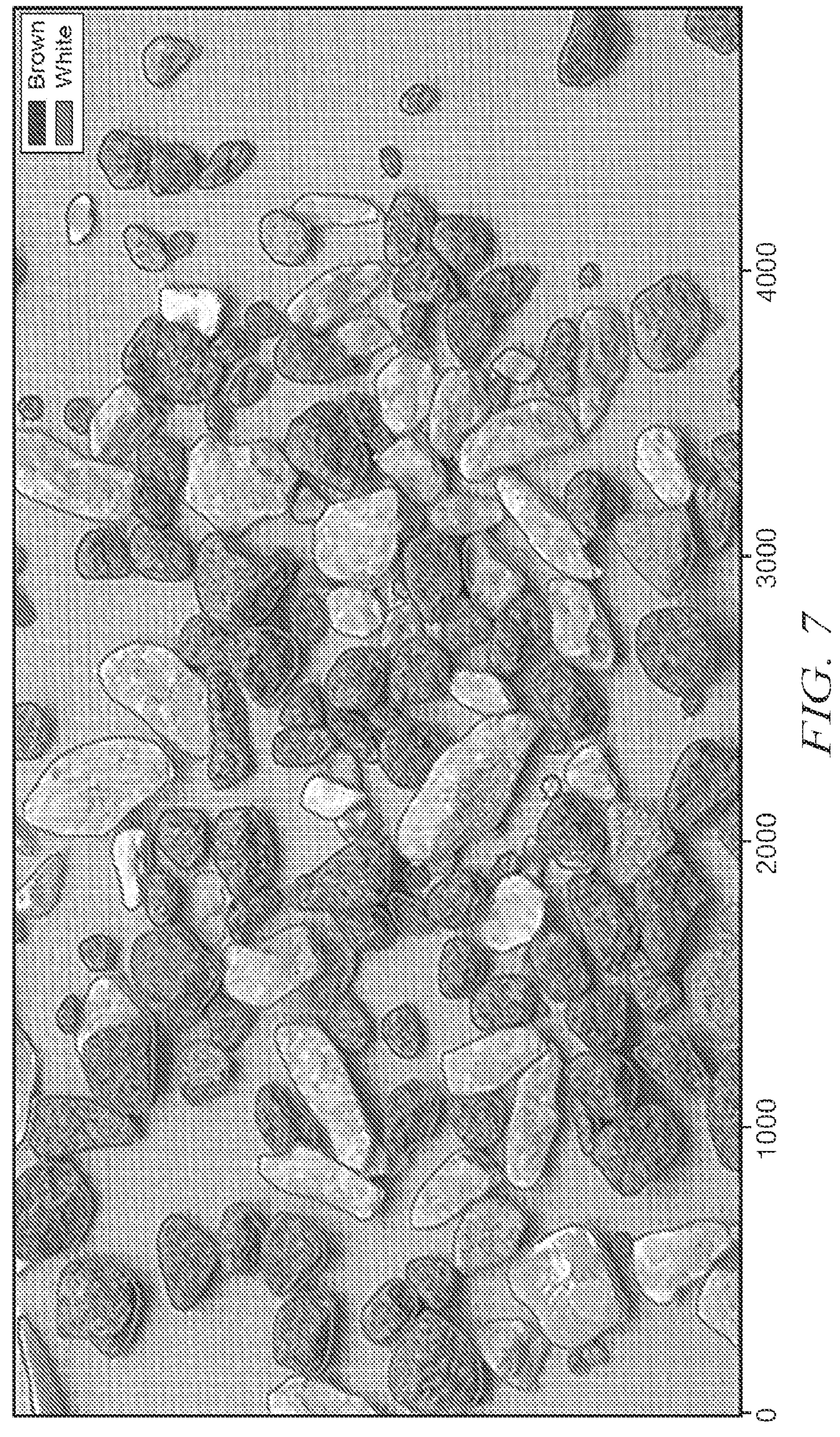
FIG. 7 depicts a segmented image in which individual, identified cuttings particles are highlighted by outline.

FIG. 7 depicts another image in which the clustering is performed via a cuttings segmentation in which individual cuttings particles are highlighted (or edge enhanced), for example, via a grey outline in the depicted embodiment. The outlined particles may be numbered, for example, to facilitate communication with off-site personnel about individual particles or clusters of particles. This clustering and/or segmentation may enable an offsite expert to select particular particle phenotypes for further physical and/or chemical evaluation, for example, via communication channel 180 depicted on FIG. 5.

The clustering and/or segmentation of the image may be conducted using any suitable algorithm, for example, including a neural network such as a pixel-by-pixel convolutional neural network (CNN) or other artificial intelligence and/or machine learning algorithms. In example embodiments, the algorithm may employ a Mask Region-Based Convolutional Neural Network (Mask R-CNN). The Mask R-CNN may be configured to identify the individual cuttings particles in the digital images and thereby generate the segmented image at 130. For example, the Mask R-CNN may produce, for example, bounding boxes and mask images.

The bounding boxes may be defined as a set of x-y coordinates in an image that indicates an image region that contains an object of interest. The bounding box may include a confidence score that ranges from 0 to 1 (e.g., with greater values indicating higher confidence score) for each object of interest. The mask image may indicate (e.g., highlight or otherwise bound) regions of interest that have a confidence score that exceeds a threshold.

In certain embodiments, the algorithm may be configured to merely segment the image (e.g., to highlight individual particles and distinct lithology types as described above). In other embodiments, the algorithm may be configured to assign a preliminary lithology type label to the identified clusters (which may then be verified or corrected by an expert at the off-site location). For example, the algorithm may be trained, for example, using extracted color and texture features of different cuttings particle types (e.g., lithology types), sizes, shapes, colors, etc. and may make use of an image database including visible, infrared, and/or ultraviolet images of cuttings particles. The CNN may be trained on datasets of cutting sample images collected from lithologies around the world or on images obtained from sample images collected from lithologies obtained locally (e.g., in the local basin). The training images may be manually annotated at both the pixel-level (assigning a rock type label to each image pixel) and/or at the rock or particle level (assigning a rock type label to each rock or particle in the image).

In general, the lithology of a rock or cuttings particle is a description of its physical characteristics visible at an outcropping, in hand or core samples, or with low magnification microscopy. Lithology may refer to either a detailed description of these physical characteristics, or a summary of the gross physical character of a rock. In a second sense, the lithology of a rock (or cuttings particle) refers to a type of rock or a gross (or macro) identification or classification of the rock. Example lithologies or lithology types in this second sense include sandstone, limestone, slate, shale, basalt, coal, anhydrite, dolomite, gypsum, clay, chert, granite, and the like. As such, color and/or texture features represent physical characteristics of a lithology that may be measured and quantified from a digital image and evaluated to determine the lithology of a formation (in the second sense). For example, the color and/or texture features extracted from selected particles in the segmented image may be evaluated using a trained model to classify the lithology type(s) of those selected particles.

Cuttings properties may be measured at 140 (FIG. 5). The properties may be determined, for example, via physical and/or chemical tests including hardness measurements, a calcimetry test on the mixed sample or on particles of an individual lithology, fluorescence measurements, density measurements, and/or chemical reactivity with an acid such as hydrochloric acid. Additional measurements may also be specified by the offsite experts after reviewing the images and/or clustering generated at 110 and 130. Such additional tests may include, for example, additional chemical and/or physical tests.

The acquired and depth-labeled images, clustering of lithology types, and chemical and/or physical measurements may be transferred (transmitted) to the offsite location (e.g., the offsite evaluation center 60) at 150. It will be appreciated that the above-described cuttings data may be transmitted to the offsite location at substantially any suitable time or measured depth interval. For example, the data may be transferred frequently such as image by image (or cuttings sample by cuttings sample) or infrequently such as in large batches representative of a predetermined measured depth interval (e.g., 50, 100, 300, 500, or 1000 ft intervals) or time interval (e.g., every half hour, hour, two hours, eight hours, or even every 12 hours). The disclosed embodiments are expressly not limited in this regard.

With continued reference to element 150 of FIG. 5, a software application (an app) may be utilized to store, transfer, and evaluate the data. For example, in certain embodiments, entering the data into the app may automatically make it available to experts (or other operators) at the offsite location (and therefore automatically transfer the data to the offsite location). Therefore, in example embodiments, transferring the data from the rig site location to the offsite location at 150 may include uploading the data to the application. The data may then be downloaded from the application or simply viewed on the application. Likewise, transferring the cuttings description or requests for additional information from the offsite location to the rig site location at 190 may include uploading the information to the application, where it may be downloaded or viewed. It will further be appreciated that the application and the stored contents thereof may be located, for example, at the offsite evaluation center 60 or some other location, such as a cloud server. The disclosed embodiments are not limited in this regard.

Figure 8A:
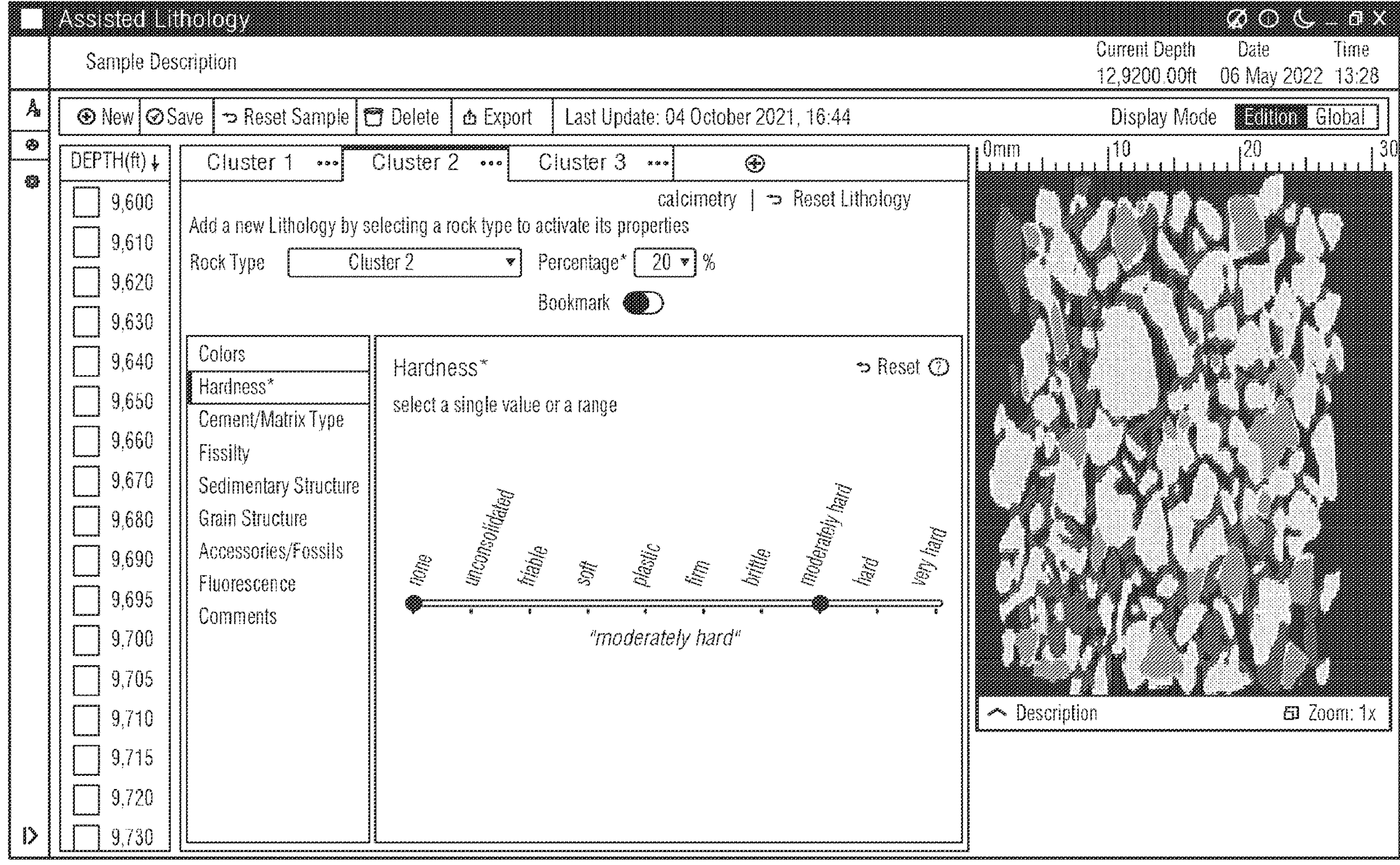
Figure 8B:
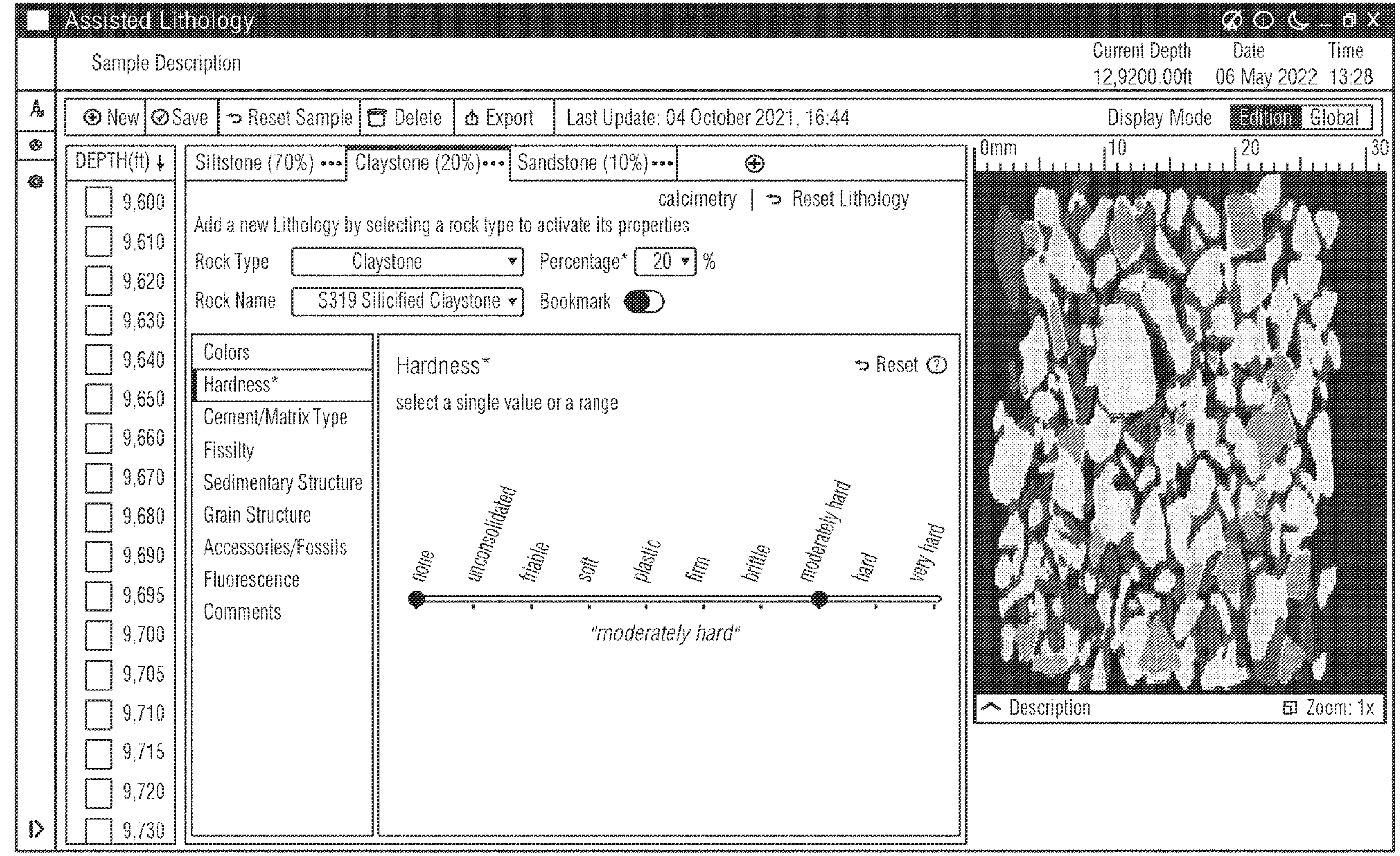

FIGS. 8A and 8B (collectively FIG. 8) depict an example software application showing a clustered image and corresponding measurement data for each of the clusters (clusters 1, 2, and 3 in this example). FIG. 8A depicts the application as configured for rig site personnel and enables these personnel to enter various measurement data (such as hardness, as depicted) for each of the depicted clusters and/or segments. FIG. 8B depicts the application as configured for offsite personnel (e.g., the expert) and enables these personnel to view the clustering and corresponding data and to label each cluster (e.g., siltstone, claystone, and sandstone in this example) and to further describe each cluster (e.g., to enter a cement/matrix type, a fissility, a sedimentary structure, etc.). The offsite personnel may further add additional comments to the application.

As briefly described above, the offsite personnel may use an application or other software to label each of the depicted clusters in the clustered image at 160. This may be readily accomplished using a software application as described above. The offsite personnel may determine the labels, for example, based on a visual examination of the images as well as the measured properties for each cluster. Various image processing techniques may also be implemented in the labeling, particularly in quantifying the amount of each lithology type (which may be determined, for example, based on the relative area occupied by each cluster in the image).

The offsite personnel may further use an application to provide (or generate) a more detailed description of each lithology type at 170. From time to time the offsite personnel may desire more data to complete the labeling or description at 160 and 170. In such instances, a request for additional tests or information may be made at 190, for example via the application.

Once the cuttings description has been completed at a number of depths, e.g., either manually or via an automated algorithm, the description may be used to project the properties of the various lithology types to depth to thereby generate a depth log. U.S. Patent Publication 2021/0108511, which is fully incorporated by reference herein, discloses one example automated routine for generating a depth projection from which a log may in turn be generated. As is known to those of ordinary skill, a log is merely a plot of various measurements and/or properties with respect to wellbore depth.

It will be understood that the present disclosure includes numerous embodiments. These embodiments include, but are not limited to, the following embodiments.

In a first embodiment, a method for generating a depth log of drill cuttings obtained while drilling a subterranean wellbore includes acquiring a digital image of drill cuttings at a rig site; generating a clustering of lithology types in the digital image at the rig site; electronically transferring the digital image and the clustering of lithology types from the rig site to an offsite location; and evaluating the digital image and the clustering of lithology types at the offsite location to label and generate a cuttings description for each of the clustered lithology types.

A second embodiment may include the first embodiment, wherein the acquiring the digital image comprises drilling the subterranean wellbore; collecting the drill cuttings from circulating drilling fluid; preparing the drill cuttings; and taking a digital image of the prepared drill cuttings at the rig site.

A third embodiment may include any one of the first through second embodiments further comprising depth labelling the digital image with a lagged depth at the rig site, the lagged depth being indicative of a measured depth at which the drill cuttings were generated in the subterranean wellbore.

A fourth embodiment may include any one of the first through third embodiments, further comprising measuring a physical property of each of the clustered lithology types at the rig site, wherein the measuring includes at least one of a hardness measurement, a density measurement, a fluorescence measurement, a calcimetry measurement, and a measurement of chemical reactivity with an acid.

A fifth embodiment may include any one of the first through fourth embodiments, further comprising generating a depth log including the labeled lithology types and selected properties of the drill cuttings at the offsite location.

A sixth embodiment may include any one of the first through fifth embodiments, further comprising electronically transferring the cuttings description from the offsite location to the rig site.

A seventh embodiment may include the sixth embodiment, wherein the electronically transferring the digital image and the clustering of lithology types from the rig site to an offsite location comprises uploading the digital image and the clustering of lithology types to a software application that is available to personnel at the offsite location; and the electronically transferring the cuttings description from the offsite location to the rig site comprises uploading the cuttings description to the software application.

An eighth embodiment may include any one of the first through seventh embodiments, wherein the clustering of lithology types automatically generates a segmented image via a cuttings segmentation algorithm that identifies and highlights individual cuttings particles or provides a pixel-by-pixel identification of lithology types; and the segmented image is electronically transferred to the offsite location.

A ninth embodiment may include any one of the first through eighth embodiments, wherein the clustering of lithology types automatically generates a labeled segmented image via a cuttings segmentation and labeling algorithm that identifies and highlights individual cuttings particles and labels the lithology types based upon at least one of a color, a size, a shape, and a texture of the cuttings; and the labeled segmented image is electronically transferred to the offsite location.

A tenth embodiment may include any one of the first through ninth embodiments, further comprising depth-labelling the digital image with a lagged depth at the rig site, the lagged depth being indicative of a measured depth at which the drill cuttings were generated in the subterranean wellbore; measuring at least one physical property of each of the clustered lithology types at the rig site, wherein the measuring includes at least one of a hardness measurement, a density measurement, a fluorescence measurement, a calcimetry measurement, and a measurement of chemical reactivity with an acid; and generating a depth log including the labeled lithology types and selected properties of the drill cuttings at the offsite location, wherein the electronically transferring the digital image and the clustering of lithology types from the rig site to an offsite location comprises uploading the depth-labeled digital image, the at least one physical property, and the clustering of lithology types to a software application that is available to personnel at the offsite location, and wherein the electronically transferring the cuttings description from the offsite location to the rig site comprises uploading the cuttings description and the depth log to the software application.

In an eleventh embodiment, a system for generating a depth log of cuttings obtained during a subterranean drilling operation includes a digital camera located at a rig site, the digital camera configured to acquire a digital image of drill cuttings; a first processor located at the rig site, the first processor configured to generate a clustering of lithology types in the digital image and to electronically transfer the clustering of lithology types and the digital image to an offsite location; and a second processor located at the offsite location, the second processor configured to receive and make the electronically transferred clustering of lithology types and the digital image available to personnel at the offsite location for further evaluation, the second processor further configured to receive a cuttings description from the personnel at the offsite location and to electronically transfer the cuttings description to the rig site.

A twelfth embodiment may include the eleventh embodiment, wherein the first processor and the second processor are configured to run a software application that is configured to display the digital image, the clustering of lithology types, and the cuttings description; electronically transferring the clustering of lithology types and the digital image to an offsite location comprises uploading the clustering of lithology types and the digital image to the software application; and the cuttings description is automatically transferred to the rig site when it is uploaded to the software application by the personnel at the offsite location.

A thirteenth embodiment may include any one of the eleventh through twelfth embodiments, wherein the cuttings description comprises at least a depth log of labeled lithology types and selected properties of the drill cuttings.

A fourteenth embodiment may include any one of the eleventh through thirteenth embodiments, wherein the clustering of lithology types comprises a segmented image that identifies and highlights individual cuttings particles or provides a pixel-by-pixel identification of lithology types.

A fifteenth embodiment may include any one of the eleventh through fourteenth embodiments, wherein the clustering of lithology types comprises a segmented and labeled image that identifies and highlights individual cuttings particles and labels the lithology types based upon at least one of a color, a size, a shape, and a texture of the cuttings.

In a sixteenth embodiment, a method for generating a depth log of cuttings obtained while drilling a subterranean wellbore includes acquiring a digital image of the cuttings at a rig site; depth-labelling the digital image with a lagged depth at the rig site, the lagged depth being a formation depth at which the cuttings were sampled from a subterranean formation; generating a clustering of lithology types in the digital image at the rig site; electronically transferring the digital image and the clustering of lithology types from the rig site to an offsite location; evaluating the digital image and the clustering of lithology types at the offsite location to label each of the clustered lithology types and generate a cuttings description for each of the clustered lithology types; generating a depth log at the offsite location, the depth log including at least the labeled lithology types and selected properties of the drill cuttings; and electronically transferring the cuttings description and the depth log from the offsite location to the rig site.

A seventeenth embodiment may include the sixteenth embodiment, wherein the acquiring the images comprises drilling a subterranean wellbore; collecting the cuttings from circulating drilling fluid; preparing the cuttings; and taking a digital photograph of the prepared cuttings at the rig site.

An eighteenth embodiment may include any one of the sixteenth through seventeenth embodiments, further comprising measuring a physical property of each of the lithology types at the rig site, wherein the measuring includes at least one of a hardness measurement, a density measurement, a fluorescence measurement, a calcimetry measurement, and a measurement of chemical reactivity with an acid.

A nineteenth embodiment may include any one of the sixteenth through eighteenth embodiments, wherein the electronically transferring of the images and the clustering of lithology types from the rig site to an offsite location comprises uploading the images and the clustering of lithology types to a software application that is available to personnel at the offsite location; and the electronically transferring of the cuttings description and the depth log from the offsite location to the rig site comprises uploading the cuttings description and the depth log to the software application where it is available to personnel at the rig site.

A twentieth embodiment may include any one of the sixteenth through nineteenth embodiments, wherein: the clustering of lithology types automatically generates a segmented image via a cuttings segmentation algorithm that identifies and highlights individual cuttings particles or provides a pixel-by-pixel identification of lithology types; or the clustering of lithology types automatically generates a labeled segmented image via a cuttings segmentation and labeling algorithm that identifies and highlights individual cuttings particles and labels the lithology types based upon at least one of a color, a size, a shape, and a texture of the cuttings.

Although collaborative generation of cuttings logs via artificial intelligence has been described in detail, it should be understood that various changes, substitutions, and alterations can be made herein without departing from the spirit and scope of the disclosure as defined by the appended claims.

We claim:

1. A method for generating a depth log of drill cuttings obtained while drilling a subterranean wellbore, the method comprising:
acquiring a first digital image of the drill cuttings at a rig site;
generating a clustering of lithology types in the first digital image at the rig site to obtain clustered lithology types using a mask region-based convolutional neural network model,
wherein the clustered lithology types comprise at least one of sandstone, siltstone, claystone, limestone, slate, shale, basalt, coal, anhydrite, dolomite, gypsum, clay, chert, granite, or carbonate,
wherein at least one of the clustered lithology types is provided by an operator,
wherein the model is trained using color and texture features of different lithology types and visible, infrared, and ultraviolet images of second drill cuttings;
electronically transferring the first digital image and the clustered lithology types from the rig site to an offsite location;
evaluating the first digital image and the clustered lithology types at the offsite location to label and generate a cuttings description for each of the clustered lithology types; and
electronically transferring the cuttings description and the depth log from the offsite location to the rig site to request additional measurements to update the cuttings description and the depth log.

2. The method of claim 1, wherein acquiring the first digital image comprises:
drilling the subterranean wellbore;
collecting the drill cuttings from circulating drilling fluid;
preparing the drill cuttings to obtain prepared drill cuttings; and
taking a second digital image of the prepared drill cuttings at the rig site.

3. The method of claim 1, further comprising:
depth labelling the first digital image with a lagged depth at the rig site, the lagged depth being indicative of a measured depth at which the drill cuttings were generated in the subterranean wellbore.

4. The method of claim 1, further comprising:
measuring a physical property of each of the clustered lithology types at the rig site, wherein the measuring includes at least one of a hardness measurement, a density measurement, a fluorescence measurement, a calcimetry measurement, or a measurement of chemical reactivity with an acid.

5. The method of claim 1, further comprising:
processing the cuttings description and labeled lithology types; and
generating the depth log including the labeled lithology types and selected properties of the drill cuttings at the offsite location based at least in part on the processing.

6. The method of claim 1, wherein:
the electronically transferring the first digital image and the clustered lithology types from the rig site to the offsite location comprises uploading the first digital image and the clustered lithology types to a software application that is available to personnel at the offsite location; and
the electronically transferring the cuttings description from the offsite location to the rig site comprises uploading the cuttings description to the software application.

7. The method of claim 1, wherein:
the clustering of lithology types automatically generates a segmented image via a cuttings segmentation algorithm that identifies and highlights individual cuttings particles or provides a pixel-by-pixel identification of lithology types; and
the segmented image is electronically transferred to the offsite location.

8. The method of claim 1, wherein:
the clustering of lithology types automatically generates a labeled segmented image via a cuttings segmentation and labeling algorithm that identifies and highlights individual cuttings particles and labels the lithology types based upon at least one of a color, a size, a shape, and a texture of the cuttings; and
the labeled segmented image is electronically transferred to the offsite location.

9. The method of claim 1, further comprising:
depth labelling the first digital image with a lagged depth at the rig site, the lagged depth being indicative of a measured depth at which the drill cuttings were generated in the subterranean wellbore;
measuring at least one physical property of each of the clustered lithology types at the rig site, wherein the measuring includes at least one of a hardness measurement, a density measurement, a fluorescence measurement, a calcimetry measurement, and a measurement of chemical reactivity with an acid; and
generating the depth log including labeled lithology types and selected properties of the drill cuttings at the offsite location,
wherein the electronically transferring the first digital image and the clustered lithology types from the rig site to the offsite location comprises uploading a depth labeled digital image, the at least one physical property, and the clustered lithology types to a software application that is available to personnel at the offsite location, and
wherein the electronically transferring the cuttings description from the offsite location to the rig site comprises uploading the cuttings description and the depth log to the software application.

10. A system for generating a depth log of cuttings obtained during a subterranean drilling operation, the system comprising:
a digital camera located at a rig site, the digital camera configured to acquire a digital image of drill cuttings;
a first processor located at the rig site, the first processor configured to:
generate a clustering of lithology types in the digital image to obtain clustered lithology types using a mask region-based convolutional neural network model,
wherein the clustered lithology types comprise at least one of sandstone, siltstone, claystone, limestone, slate, shale, basalt, coal, anhydrite, dolomite, gypsum, clay, chert, granite, or carbonate,
wherein at least one of the clustered lithology types is provided by an operator,
wherein the model is trained using color and texture features of different lithology types and visible, infrared, and ultraviolet images of second drill cuttings; and electronically transfer the clustered lithology types and the digital image to an offsite location; and a second processor located at the offsite location, the second processor configured to receive and make the clustered lithology types and the digital image available to personnel at the offsite location for further evaluation, the second processor further configured to receive a cuttings description from the personnel at the offsite location and to electronically transfer the cuttings description and the depth log to the rig site to request additional measurements to update the cuttings description and the depth log.

11. The system of claim 10, wherein:

the first processor and the second processor are configured to run a software application that is configured to display the digital image, the clustered lithology types, and the cuttings description;

electronically transferring the clustered lithology types and the digital image to the offsite location comprises uploading the clustered lithology types and the digital image to the software application; and the cuttings description is automatically transferred to the rig site when it is uploaded to the software application by the personnel at the offsite location.

12. The system of claim 10, wherein the cuttings description comprises at least a second depth log of labeled lithology types and selected properties of the drill cuttings.

13. The system of claim 10, wherein the clustering of lithology types comprises a segmented image that identifies and highlights individual cuttings particles or provides a pixel-by-pixel identification of lithology types.

14. The system of claim 10, wherein the clustering of lithology types comprises a segmented and labeled image that identifies and highlights individual cuttings particles and labels the lithology types based upon at least one of a color, a size, a shape, and a texture of the cuttings.

15. A method for generating a depth log of drill cuttings obtained while drilling a subterranean wellbore, the method comprising:

acquiring a digital image of the drill cuttings at a rig site;

depth labelling the digital image with a lagged depth at the rig site, the lagged depth being a formation depth at which the cuttings were sampled from a subterranean formation;

generating a clustering of lithology types in the digital image at the rig site to obtain clustered lithology types using a mask region-based convolutional neural network model, wherein the clustered lithology types comprise at least one of sandstone, siltstone, claystone, limestone, slate, shale, basalt, coal, anhydrite, dolomite, gypsum, clay, chert, granite, or carbonate, wherein at least one of the clustered lithology types is provided by an operator, wherein the model is trained using color and texture features of different lithology types and visible, infrared, and ultraviolet images of second drill cuttings;

electronically transferring the digital image and the clustered lithology types from the rig site to an offsite location;

evaluating the digital image and the clustered lithology types at the offsite location to label and generate a cuttings description for each of the clustered lithology types;

generating the depth log at the offsite location, the depth log including at least labeled lithology types and selected properties of the drill cuttings; and electronically transferring the cuttings description and the depth log from the offsite location to the rig site to request additional measurements to update the cuttings description and the depth log.

16. The method of claim 15, wherein acquiring the digital image comprises:

drilling the subterranean wellbore;

collecting the drill cuttings from circulating drilling fluid;

preparing the drill cuttings to obtain prepared drill cuttings; and taking a digital photograph of the prepared drill cuttings at the rig site.

17. The method of claim 15, further comprising:

measuring a physical property of each of the clustered lithology types at the rig site, wherein the measuring includes at least one of a hardness measurement, a density measurement, a fluorescence measurement, a calcimetry measurement, or a measurement of chemical reactivity with an acid.

18. The method of claim 15, wherein:

the electronically transferring the digital image and the clustered lithology types from the rig site to the offsite location comprises uploading the digital image and the clustered lithology types to a software application that is available to personnel at the offsite location; and the electronically transferring the cuttings description and the depth log from the offsite location to the rig site comprises uploading the cuttings description and the depth log to the software application where it is available to personnel at the rig site.

19. The method of claim 15, wherein:

the clustering of lithology types automatically generates a segmented image via a cuttings segmentation algorithm that identifies and highlights individual cuttings particles or provides a pixel-by-pixel identification of lithology types; and the clustering of lithology types automatically generates a labeled segmented image via a cuttings segmentation and labeling algorithm that identifies and highlights individual cuttings particles and labels the lithology types based upon at least one of a color, a size, a shape, or a texture of the cuttings.

* * * * *